US006829253B1

(12) United States Patent
Koorapaty et al.

(10) Patent No.: US 6,829,253 B1
(45) Date of Patent: Dec. 7, 2004

(54) METHODS AND SYSTEMS FOR EFFICIENTLY USING SYNCHRONIZATION INFORMATION IN TRANSITIONING BETWEEN CHANNELS IN TDMA AND CDMA COMMUNICATIONS SYSTEMS

(75) Inventors: Havish Koorapaty, Cary, NC (US); Robert A. Zak, Apex, NC (US); Carl B. Toot, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 928 days.

(21) Appl. No.: 09/723,634

(22) Filed: Nov. 28, 2000

(51) Int. Cl.[7] .............................................. H04L 7/08
(52) U.S. Cl. ...................................... 370/514; 379/368
(58) Field of Search ............................... 370/509–514; 375/365–368

(56) References Cited

U.S. PATENT DOCUMENTS

| | | | |
|---|---|---|---|
| 5,274,676 A | 12/1993 | Gose et al. ................. | 375/106 |
| 6,014,376 A | 1/2000 | Abreu et al. ................ | 370/350 |
| 6,452,991 B1 * | 9/2002 | Zak ............................. | 375/365 |
| 6,546,026 B1 * | 4/2003 | Goeddel ...................... | 370/513 |
| 6,728,326 B1 * | 4/2004 | Fulghum ..................... | 375/365 |

FOREIGN PATENT DOCUMENTS

WO  WO 99/56422  11/1999  ............. H04J/3/06

OTHER PUBLICATIONS

Communication Relating to the Results of the Partial International Search (Annex to Form PCT/ISA/206 dated May 14, 2002) for PCT/USO1/31455.

TR45; TIA/EIA–136–133–BA; TDMA Third Generation Wireless; Digital Traffic Channel Layer 3; Mar. 27, 2000, pp. 1–62.

International Search Report for PCT/US01/31455.

* cited by examiner

Primary Examiner—Melvin Marcelo
(74) Attorney, Agent, or Firm—Myers Bigel Sibley & Sajovec

(57) ABSTRACT

Methods and systems for a transceiver to acquire synchronization to a channel in a TDMA communications system by identifying a known synchronization word in a burst received at the transceiver over the channel are provided. Pursuant to these methods and systems a first uncertainty window and a second uncertainty window are defined within a burst that is received over the channel. The transceiver may search in these uncertainty windows for the known synchronization word, where the first uncertainty window is smaller than the second uncertainty window. The first uncertainty window is first searched for the known synchronization word. It may then be determined if the known synchronization word has been located within the first uncertainty window. If it has not been, the second uncertainty window is then searched for the known synchronization word.

22 Claims, 8 Drawing Sheets

METHODS AND SYSTEMS FOR EFFICIENTLY USING SYNCHRONIZATION INFORMATION IN TRANSITIONING BETWEEN CHANNELS IN TDMA AND CDMA COMMUNICATIONS SYSTEMS

FIELD OF THE INVENTION

The present invention relates generally to wireless communications systems and, more particularly, to transitioning wireless users to a new channel in time division multiple access communications systems.

BACKGROUND OF THE INVENTION

Many digital cellular telephone networks use time division multiple access ("TDMA") channels for dividing communications resources among the terminals using the network. By way of example, digital cellular telephone networks operating under the TIA/EIA-136 standard employ a frequency division multiple access ("FDMA")/TDMA system in which the frequency band is divided into numerous sub-bands. Each of these FDMA sub-bands, in turn, is divided in time using a repeating 20 ms frame structure. Each 20 ms frame is divided into three 6.67 ms communications time slots. Each of these three time slots on a particular sub-band typically operates as a separate "channel."

Mobile terminals operating in a mobile wireless communications system in many instances make transitions between channels. For instance, when the mobile terminal moves from the coverage area of one base station to another, a transition between channels may be made. The need to transition between channels may occur during periods of communications and/or when the terminal is in standby mode. In unsynchronized communications systems, the mobile terminal must synchronize to the new channel before communications may proceed. Synchronization to the new channel may also be required even if the base stations are synchronized if, for example, the mobile terminals do not have information regarding their propagation delay to the new base station, or if frequency synchronization is required.

Synchronization is typically accomplished by including a synchronization sequence or "syncword" within each of the communications time slots provided on each frequency sub-band. In traditional TDMA systems, a unique syncword is transmitted during each time slot. Thus, for example, under the TIA/EIA-136 protocol, a total of 162 differential quadrature phase shift keyed ("DQPSK") symbols are transmitted in each time slot, the first 14 of which comprise the above-mentioned syncword. As TIA/EIA-136 allows for up to six time slots per frequency sub-band in a time period of 40 ms (when operating in half rate mode), a total of six unique syncwords are specified, one for each of the TDMA time slots. The mobile terminal knows each of these syncwords, and may use these syncwords to acquire synchronization to the channel as described below.

In transitioning to a new channel, the mobile terminal typically tunes to the carrier frequency of the new channel (if necessary) and then searches for the synchronization word associated with the communication slot to which it has been assigned. As the frame length is 20 ms, the period of uncertainty is 20 ms. However, if the mobile terminal searches for all possible syncwords, it is only necessary to search for the syncword over the time period of one slot plus the length of one syncword. Thus, for example, in TIA/EIA-136 systems, the mobile terminal may, instead of searching the whole 20 ms frame for one syncword, only search over an uncertainty period of 176 symbols (i.e., the 162 symbols which comprise the length of one time slot plus the 14 symbols that are the length of one syncword) for all six syncwords. By searching over this 176 symbol period, it is guaranteed that at least one of the six predefined syncwords will be present in the portion of the received signal that is searched.

In some TDMA systems, the system may provide additional information to the mobile terminal that assists in the transition between channels. For instance, in the TIA/EIA-136 system, an optional information element called "Delta Time" may be provided to the mobile terminal by its current base station that enables the mobile terminal to reduce the length (in time) of its search window when transitioning to a new channel. In TIA/EIA-136 systems, the Delta Time information is specified as an offset (in half symbols) from the timing on the current channel. The base station to which the mobile terminal is to transition can calculate this offset by listening to communications between the mobile terminal and its current base station to determine the offset in timing between those communications and the slot to which the mobile terminal will be assigned on one of the new base stations' frequency sub-bands. This offset information is then provided by the new base station through the cellular network infrastructure to the current base station, which passes it on to the mobile terminal.

As noted above, the Delta Time information notifies the mobile terminal as to when it should transmit its communications to the new base station. However, since the mobile terminal may not have accurate information regarding its propagation delay to the new base station, it typically does not know the precise timing of the signals it is to receive from the new base station. However, given the line-of-sight nature of most ground-based wireless TDMA communications systems, the variability in timing which can result from the physical distance of the mobile terminal from the new base station (which effects the propagation delay) is typically quite small, and, thus, based on the Delta Time information the mobile terminal can typically determine a relatively small uncertainty window in which it can expect to find the synchronization word on bursts transmitted by the new base station. In TIA/EIA-136 communications systems, the uncertainty window when Delta Time information is used is specified as 4 symbols before the expected location of the synchronization word and 19 symbols after the expected location. As the synchronization word is 14 symbols long, this means that the entirety of the synchronization word should fall within an uncertainty window that is 37 symbols in length. Thus, in TIA/EIA-136 systems, the "Delta Time" information, if accurate, may be used to reduce the length of the uncertainty window from approximately 500 symbols to 37 symbols.

In a TIA/EIA-136 system, the offset between the end of the burst transmitted by the mobile terminal and the beginning of the burst received by the mobile terminal is defined as the sum of (i) the Standard Offset Reference or "SOR" and (ii) the Timing Advance or "TA." The SOR is defined as the time difference between the end of the burst transmitted by the mobile terminal and the beginning of the burst received by the mobile terminal when the propagation delay between the base station and the mobile terminal is zero. In TIA/EIA-136 systems, the SOR is always set to 45 symbols. The TA, on the other hand, is a variable parameter, that is set to compensate for the propagation delay between the mobile terminal and the base station (which varies depending upon the mobile terminal's distance from the base station). Each mobile terminal is assigned a TA value such that the base station may ensure that the bursts of all the mobile terminals using the base station are received simultaneously. During transitions where a mobile terminal is "handed off" from one base station to another, the current base station typically provides the new base station an estimate of the TA value that the mobile terminal will have to the new base station.

In the TIA/EIA-136 system specification, the following procedure is defined for using Delta Time information to assist in synchronizing with a new channel:

1. The time for the beginning of the burst that is to be transmitted by the mobile terminal on the new channel ("T0") is set as $T_{old}$–DT, where $T_{old}$ is the time at which the beginning of a burst was transmitted over the old channel, and where DT is the Delta Time information value (offset value) that is provided to the mobile terminal.
2. The mobile terminal searches for the known synchronization word on a burst received over the new channel during the times T0+SOR+158 symbols and T0+SOR+195 symbols (a 37 symbol period).
3. If the known synchronization word is found within the window searched in step 2:
    a. TA is reset as Sync Point–SOR–162 symbols–T0, where Sync Point is the timing of the beginning of the first symbol of the synchronization word found in the search of step 2.
    b. The TA value is examined to determine if it is between 0 and 30 half symbols. If not, it is likely that the Delta Time information is erroneous. In this situation, the TA is set to the value indicated in the handoff message from the previous channel, and the new transmit time is re-evaluated as Sync Point–SOR–162 symbols–TA.
4. If synchronization is not found within the window searched in step 2:
    a. TA is set to the value indicated in the handoff message from the previous channel.
    b. The new transmit time is set as T0=Sync Point–SOR–162 symbols–TA, where Sync Point is the timing of the received burst on the new channel found by searching the entire 20 ms uncertainty window.

SUMMARY OF THE INVENTION

The present invention provides methods and systems or efficiently synchronizing to a new channel in a TDMA system.

In embodiments of the present invention, a transceiver acquires synchronization to a channel in a TDMA communications system by identifying a known synchronization word in a burst received at the transceiver over the channel. A first uncertainty window and a second uncertainty window are defined within a burst that is received over the channel and the transceiver may search in these uncertainty windows for the known synchronization word. The first uncertainty window may be smaller than the second uncertainty window. The first uncertainty window is first searched for the known synchronization word. It may then be determined if the known synchronization word has been located within the first uncertainty window. If it has not been, the second uncertainty window is then searched for the known synchronization word.

In further embodiments of the present invention, a wireless transceiver transfers from a first channel to a second channel in a wireless communications system by acquiring an initial estimate of the frame timing associated with signals received at the transceiver over the second channel and an initial estimate of the frequency setting that will synchronize the transceiver with signals received over the second channel. It is then determined if the initial estimate of frame timing is within a specified number of symbols from an expected location, and if the difference between the frequency setting on the transceiver and the initial estimate of the frequency setting that will synchronize the transceiver with signals received over the second channel is within a second specified Limit. Then, one or more signals received over the second channel are demodulated based on the initial estimates of the frame timing and frequency setting if the initial estimate of frame timing is within the specified number of symbols of the expected location, and if the difference between the frequency setting on the transceiver and the initial estimate of the frequency setting that will synchronize the transceiver with signals received over the second channel is within the specified limit. Thereafter, the initial estimate of the frame timing associated with signals received at the transceiver over the second channel and the initial estimate of the frequency setting that will synchronize the transceiver with signals received over the second channel may be adjusted concurrently with demodulation of the signals.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Additionally, it will be understood by those of skill in the art that the present invention may be advantageously used in a variety of applications, and thus the present invention should not be construed as limited in any way to the example applications described herein.

Figure 1:
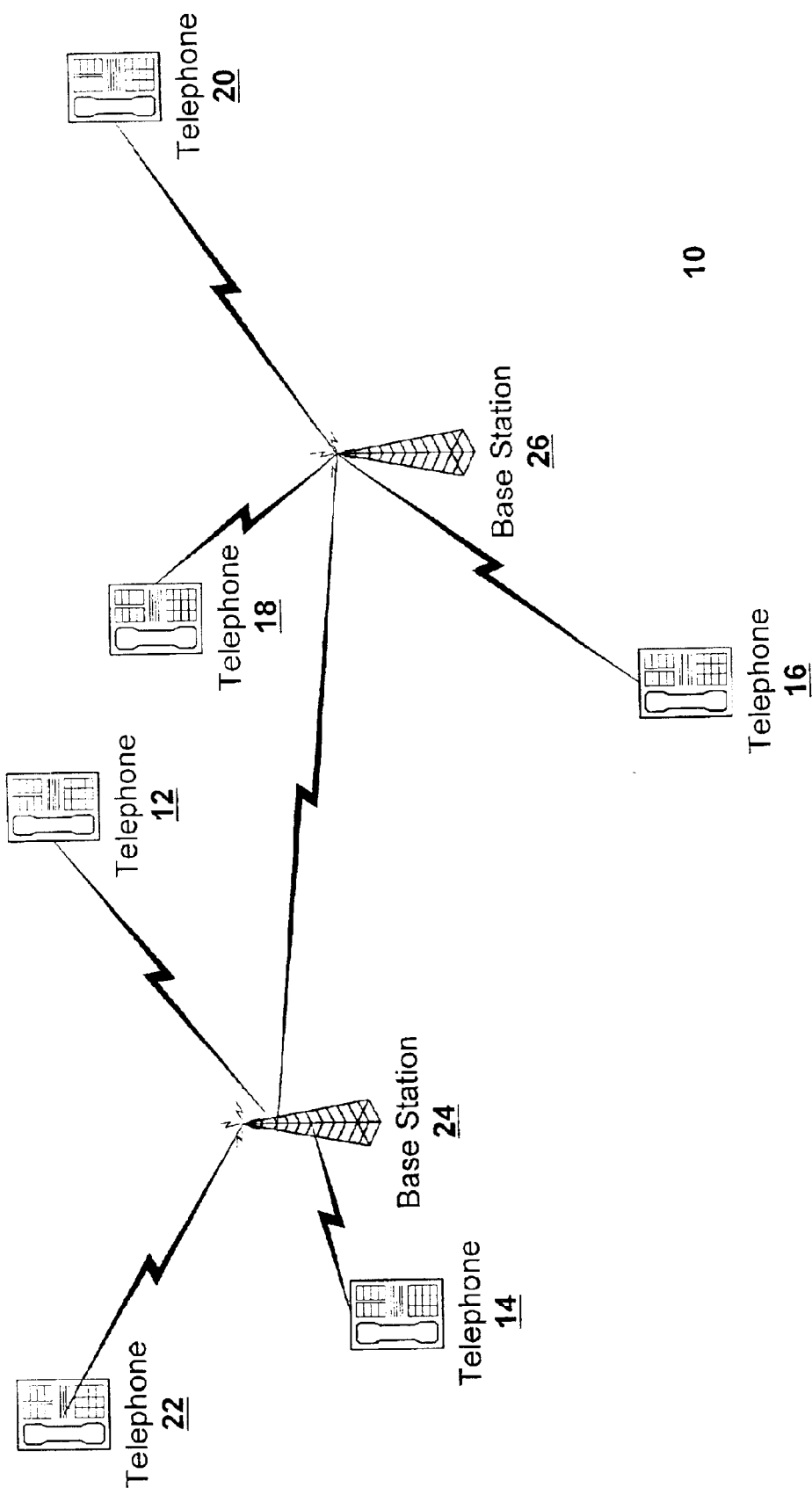
FIG. 1 depicts a set of users communicating in a FDMA/TDMA communications network.

FIG. 1 depicts a cellular telephone communications network 10 in which the synchronization according to embodiments of the present invention may be used. It will be understood in light of the present disclosure, however, that the teachings of the present invention have application beyond networks such as those depicted in FIG. 1, and, in fact, may be suitable for use in any digital communications network in which acquisition of timing synchronization is required. In the cellular telephone network 10 illustrated in FIG. 1, a plurality of user terminals 12, 14, 16, 18, 20, 22 communicate with each other and other communications terminals (which are not pictured) via base stations 24, 26 that receive calls from various of the user terminals and retransmit the calls to other user terminals either directly, via other base stations, or via another telecommunications network (such as the conventional telephone network).

Figure 2:
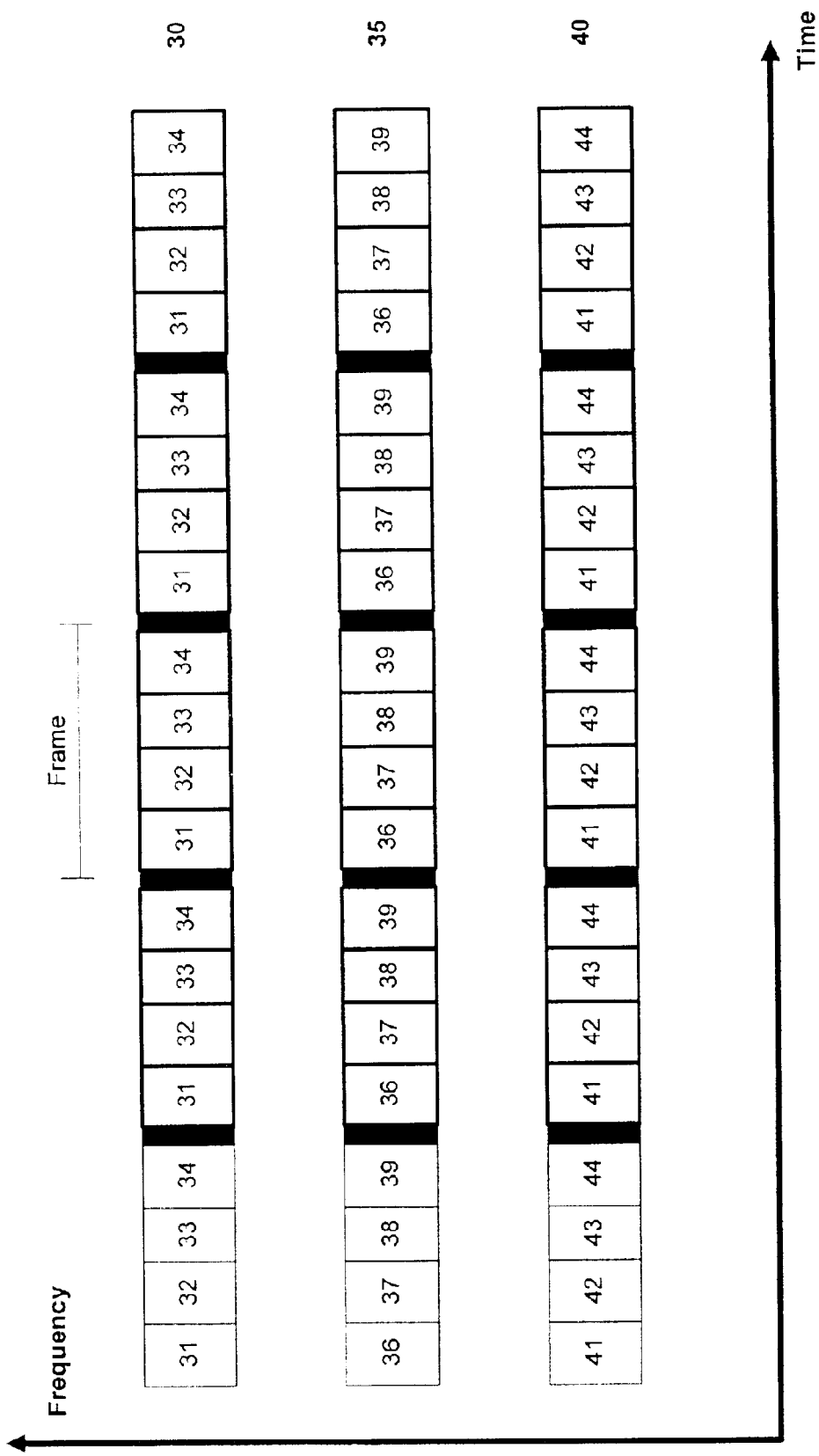
FIG. 2 illustrates a channel and frame structure in an FDMA/TDMA communication system.

As discussed above, the embodiments of the present invention may be suitable for use in any digital communications network in which acquisition of timing synchronization is required. However, for illustrative purposes, embodiments of the present invention will be described with reference to communications networks which use an FDMA/TDMA access format. FIG. 2 illustrates the channel structure of an exemplary FDMA/TDMA network which provides up to a total of twelve channels. As shown in FIG. 2, the radio frequency communications are transmitted over three separate FDMA frequency sub-bands 30, 35, 40. Each of these sub-bands are then further divided into four separate time-multiplexed channels 31, 32, 33, 34; 36, 37, 38, 39; 41, 42, 43, 44. As indicated in FIG. 2, this time multiplexing is accomplished by dividing the communications which are transmitted over the channel into a repeating series of "frames," wherein each frame is subdivided into up to four separate time slots. Each of these repeating time slots 31, 32, 33, 34; 36, 37, 38, 39; 41, 42, 43, 44 comprises a channel. Thus a user terminal which desires to communicate over the network will seek to acquire access to one of these channels by tuning to the appropriate frequency, identifying a channel which currently is not in use, and acquiring timing synchronization with that channel.

As indicated previously, a terminal which seeks to access a TDMA communications system first acquires frequency and time synchronization to one of the time slots which comprises a communications channel. One method by which a user terminal may acquire such synchronization is by receiving a signal which is transmitted by the base station and identifying the location in that signal of a predefined sequence of symbols which comprise a known synchronization word or "syncword." As indicated above, a unique syncword is typically provided for each separate time slot in a frequency sub-band, and the syncword is located at a predefined position within the time slot. Once the user terminal identifies the location of a syncword, it is possible for the terminal to thereby synchronize its frequency reference and timing with the frequency reference and timing of the transmitting base station, thereby allowing the terminal to communicate in one of the predefined time slots.

The present invention will now be described with respect to FIGS. 3–6, which are flowcharts illustrating operations according to various embodiments of the present invention. It will be understood that the blocks in these flowcharts, and combinations of blocks in these flowcharts, can generally be implemented by general purpose computer hardware, special purpose computer hardware and/or via computer program instructions. If performed in software, the program instructions may be provided to a digital signal processor, microprocessor or the like such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks. Accordingly, blocks of the flowchart illustrations support combinations of means for performing the specified functions, combinations of steps for performing the specified functions and program instruction means for performing the specified functions.

Figure 3:
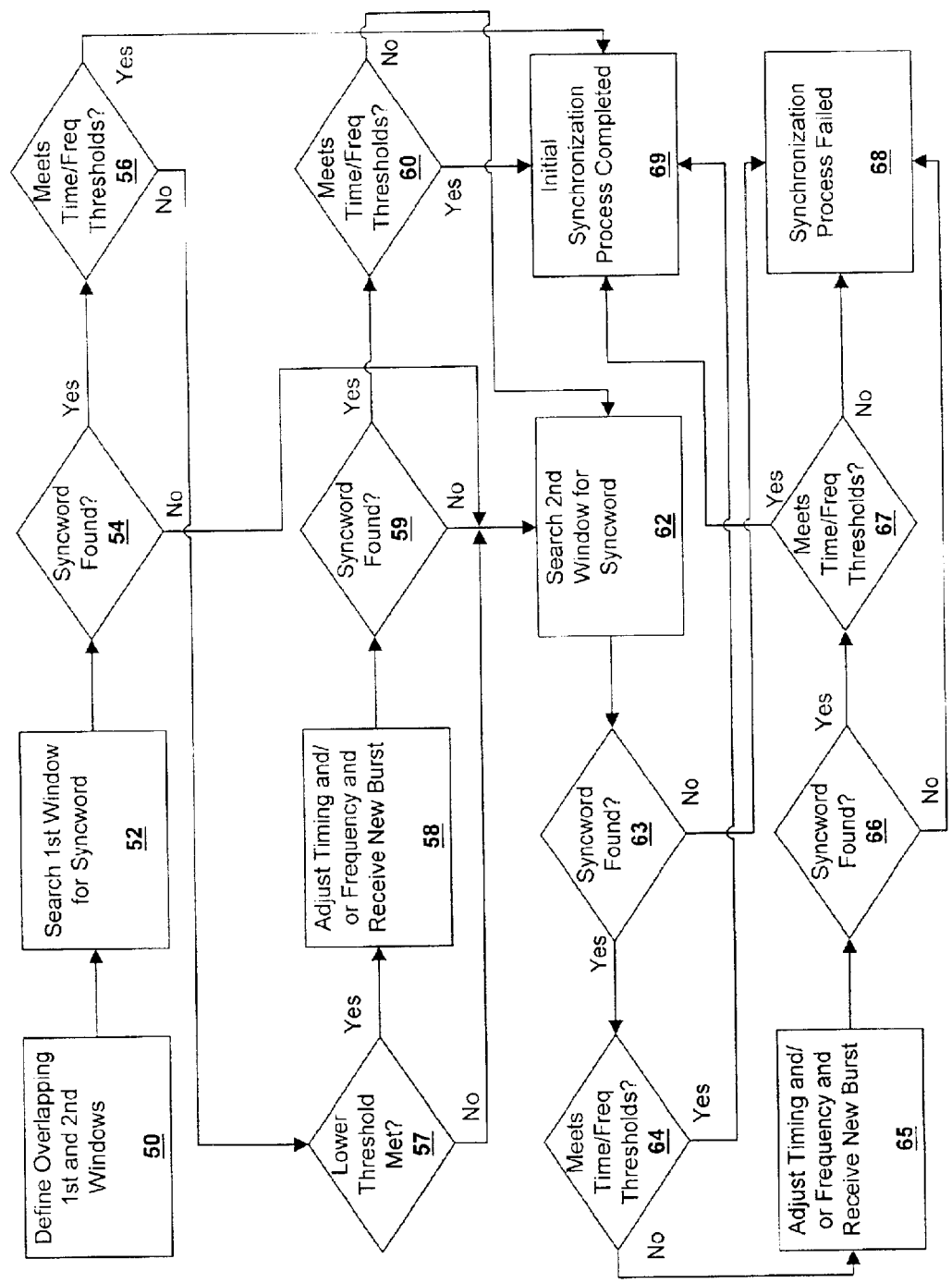
FIG. 3 is a flow chart illustrating operations for channel synchronization according to embodiments of the present invention.

FIG. 3 illustrates operations for a transceiver to acquire synchronization to a channel in a TDMA communications system by identifying a known synchronization word in a signal received at the transceiver over the channel. As shown in FIG. 3, first and second "uncertainty windows" are defined (box 50). These uncertainty windows represent a portion, in time, of the signal received over the channel which may be searched for a known synchronization word or words. As indicated in FIG. 3, the first and second uncertainty windows may be defined to be overlapping windows, and the first uncertainty window may be defined to be smaller (i.e., it contains fewer symbols) than the second uncertainty window. Thus, for instance, the first uncertainty window might be defined as part of a slot in a TDMA channel, and the second uncertainty window might be defined as the entire slot.

As indicated in FIG. 3, the first uncertainty window is first searched in an effort to locate a sequence having a high correlation to the known synchronization word (block 52). This sequence may be located (block 54) in several different ways. For example, the sequence corresponding to the known synchronization word may be identified by searching the entirety of the first synchronization window and detecting the received syncword as the sequence of symbols having the highest correlation with the known synchronization words. Alternatively, the first uncertainty window could be searched until a sequence is located having a correlation with the known synchronization words that exceeds a specified threshold. Those of skill in the art will recognize that other techniques, or variants of the above described techniques, may be used to identify the potential syncword, such as searching until a sequence is identified whose correlation with one of the known syncwords exceeds a specified threshold, and then examining a limited number of additional sequences (such as, for example, the next several sequences) that are expected to possibly have even a higher correlation value.

As will be appreciated by those of skill in the art, the sequence corresponding to the known synchronization word may be identified by correlating with the known synchronization word successive sequences of the receive burst that are the length of the known synchronization word. Typically, each successive sequence of the received burst is separated by a fraction of a symbol, such as one-eighth of a symbol.

If at block 54 the syncword is determined to have been identified, the synchronization point corresponding to the syncword may be compared to certain synchronization thresholds (block 56). Such comparisons may be desirable because the local oscillators provided in many wireless communications terminals demonstrate some degree of error in frequency (due to component tolerances, temperature changes, aging, settling time or other effects), which can cause offsets in the frequency settings of the mobile terminal and the new base station of as much as several kHz. Consequently, it may be necessary to synchronize to the new channel in both time and frequency. Such a synchronization may be accomplished by taking additional correlations in which the phase of the received signal is rotated by preset amounts so as to simulate what the received signal would have been if it had been transmitted at different frequencies.

If one of the sequences that has been phase rotated has the best correlation with the known synchronization word, then the phase rotation can be examined to estimate the modification to the frequency setting of the mobile terminal required to synchronize the frequency setting of the mobile terminal with that of the new base station.

Consequently, once the sequence corresponding to the known synchronization word has been identified (block 54), it may then be compared to one or more thresholds (block 56). As will be understood by those of skill in the art in light of the present disclosure, a variety of different thresholds may be used. By way of example, the location of the sequence corresponding to the known synchronization word within the window may be compared to an expected location for the synchronization word, or, alternatively, may be compared to determine if it is sufficiently correlated with one of the known synchronization words to indicate that there is a high probability that the identified sequence in the received signal in fact is the synchronization word. Additionally, the estimated difference between the frequency of the received signal and the frequency of the oscillator on the transceiver may be compared to a threshold (see discussion herein). It will also be understood that blocks 54 and 56 of the flowchart of FIG. 3 may be performed in a single operation that both identifies the sequence and compares it to one or more thresholds. As shown in FIG. 3, if at block 54 the synchronization word is not found, the operations proceed at block 62 as described below.

If the sequence that is identified in the first uncertainty window meets the specified threshold or thresholds (block 56), then the initial synchronization process may be considered completed (block 69). Note that at block 69 synchronization to the channel may not have been fully acquired, in that it may be necessary to fine-tune either or both of the timing and the frequency setting in order to fully synchronize the transceiver with the channel. Instead, block 69 indicates that the system at that point may assume that the synchronization sequence was found within the first uncertainty window and that, therefore, it is not necessary to search the second uncertainty window.

If the sequence that is identified in the first uncertainty window does not meet the specified threshold or thresholds at block 56, then it is determined whether or not it meets a lower threshold that still indicates the presence of a syncword (block 57). If it does not meet this lower threshold, the operations continue at block 62 as discussed below. If the lower threshold is met, the transceiver may adjust its burst timing to align with the location of the identified sequence, and/or adjust its local oscillator to correct for any estimated frequency error (block 58). Typically, the timing adjustment involves modifying the timing so that the sequence identified at block 54 will fail at an appropriate location, and may also include additional timing adjustments (typically an adjustment of less than a symbol) that are made in an effort to improve the correlation of the received sequence with one of the known synchronization sequences.

After the adjustments to the timing and/or frequency are completed, the transceiver receives a second burst over the channel (block 58). The portion of this burst corresponding to the first uncertainty window may then be searched for a synchronization word in a manner similar or identical to the manner described above with respect to block 54 (block 59). If a synchronization word is found at block 59, it may then be compared to the specified thresholds (block 60). If the thresholds, are met, initial synchronization is considered complete (block 69) as discussed above. If not, or if a synchronization word was not identified at block 59, the portion of the new burst corresponding to the second uncertainty window is searched for a sequence having a high correlation to one of the known synchronization words (block 62). If during this search of the second uncertainty window a synchronization word is found (block 63), the synchronization point corresponding to the identified sequence is compared to the specified thresholds (block 64) in a manner similar to blocks 56 and 60 described above. If the thresholds are met, the initial synchronization process is considered complete (block 69). If not, the timing and/or the frequency are may be adjusted and a new burst is received (block 65). If the synchronization word is found in this new burst (block 66), it is compared to the specified thresholds (block 67) in a manner similar to blocks 56 and 60 described above. If it is not found at block 66, or if a synchronization word was not found at block 63, the synchronization process failed (block 68).

As will be appreciated by those of skill in the art in light of the present disclosure, the operations described in FIG. 3 may be particularly advantageous in situations in which the transceiver has been provided information regarding where the synchronization word should be located. By way of example, in systems operating under the TIA/EIA-136 standard, prior to transitioning from one channel to another (which happens, for example, when a mobile terminal moves out of the operating area of one base station and into the operating area of an adjacent base station) the original channel may provide the mobile transceiver an optional information element referred to as "Delta Time" information. This Delta Time information advises the mobile transceiver as to the expected location of the synchronization word in the channel of the adjacent base station to which it has been assigned. This Delta Time information may, therefore, be used to narrow the search window for the synchronization word. Delta Time information, however, is not always reliable, and hence in certain circumstances when a narrowed search or "uncertainty" window is used, the synchronization word may fall outside the window that is searched. This may occur, for instance, due to errors in the local oscillator settings of either the mobile terminal or base station, or due to an error in the calculation or the transmission of the Delta Time information.

In cases where the Delta Time or other information regarding the location of the synchronization word is not accurate, a mechanism is needed to allow the system to realize that the information is not accurate and proceed, preferably in an efficient manner, to locate the synchronization word using more traditional techniques. Thus, as illustrated in FIG. 3, such a transition may be achieved by defining two separate uncertainty windows, where the second (larger) uncertainty window is used when the synchronization word is not identified in the first uncertainty window.

As noted in block 50 of FIG. 3, the first and second uncertainty windows may be overlapping. In particular embodiments, the first and second uncertainty windows start at the sane point. In such embodiments, when the first uncertainty window is searched for the synchronization word, the first part of the second uncertainty window is also searched as the two windows fully overlap until the end of the first uncertainty window. Thus, in the case where the search continues through the second uncertainty window, in many instances it will not be necessary to search the first portion of the second uncertainty window as it was already searched in conjunction with the first uncertainty window. This may serve to shorten the time required to obtain synchronization in situations in which it becomes necessary to search the second uncertainty window. Additionally, the searches of both windows may be performed using the received data stream from a single burst. Thus, it may not be necessary to receive a second burst before starting the search for the synchronization word using traditional techniques which may be required if the search using the Delta Time information is unsuccessful.

As noted above, in some situations it may be necessary to search the second uncertainty window, as indicated in FIG. 3 at block 62. This may be accomplished by searching the entire second window, or, alternatively, by searching the window until the synchronization sequence is identified (e.g., a sequence having a correlation with one of the known synchronization words that exceeds some specified threshold). Those of skill in the art will also understand that modifications to these above alternatives may also be employed such as, for example, performing correlations at partial-symbol offsets from a sequence that is identified that has a high correlation with the known synchronization word.

During the synchronization process a transceiver may obtain partial synchronization information. For instance, the mobile transceiver may have located the synchronization word in a burst received over the new channel (and hence knows its timing for receiving signals), but may not have accurate information regarding its distance from the new base station, which is necessary to set its timing for transmitting signals. In at least some instances, such as the above examples, this partial information may be insufficient for the transceiver to transmit information, as the partial information may not adequately guarantee that the mobile terminals timing and/or frequency synchronization falls within the requirements specified by the system. However, in order to improve the perceived quality of the communications to the user of the transceiver, bursts that are received after partial synchronization information is obtained may be demodulated so that the user may at least receive information while the synchronization process is being completed. Such partial synchronization demodulation may be particularly useful in situations where some assurances exist that the partial synchronization information is relatively accurate.

Figure 4:
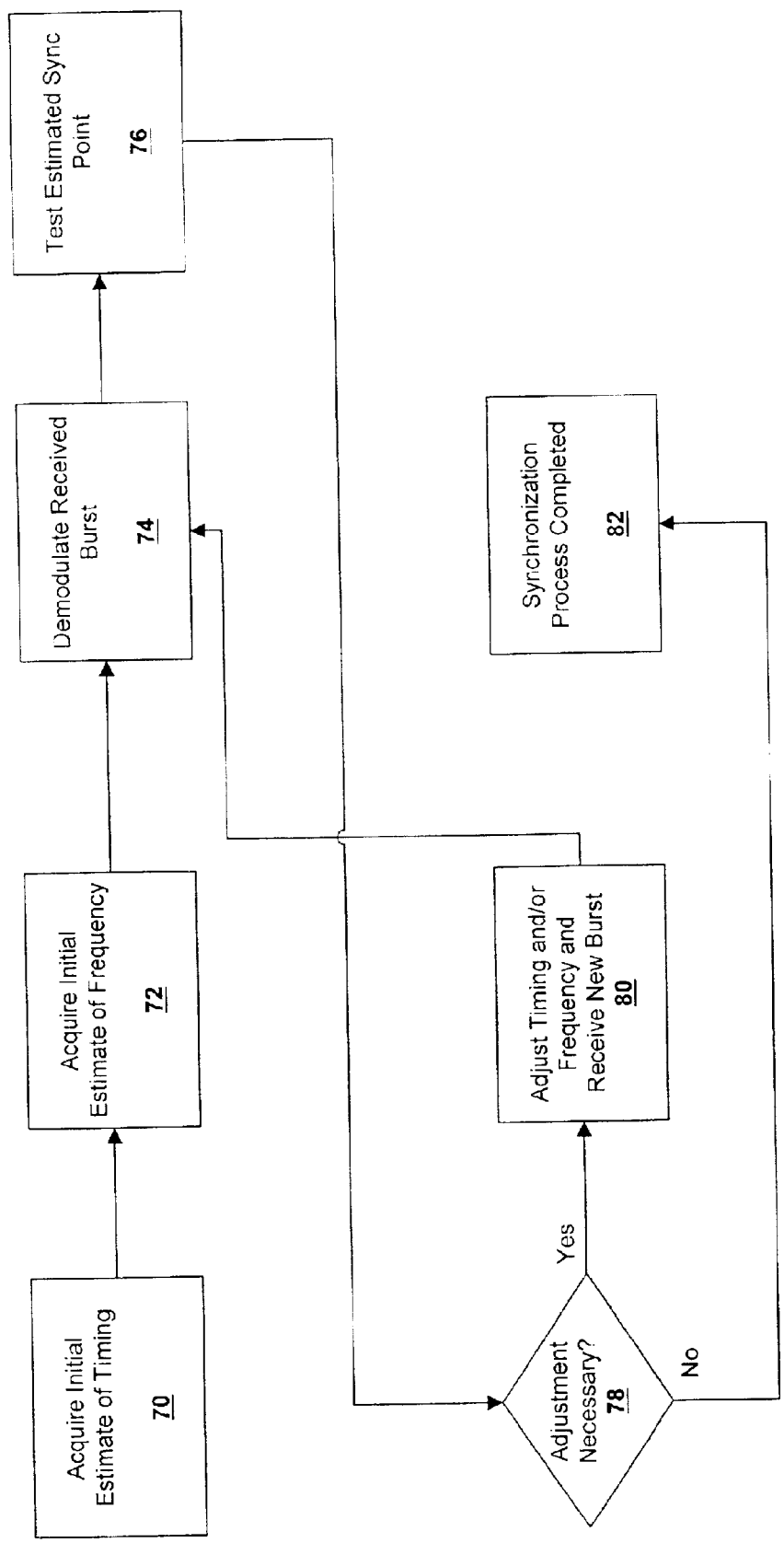
FIG. 4 is a flow chart illustrating operations for channel synchronization according to further embodiments of the present invention.

FIG. 4 is a flow chart that depicts operations according to embodiments of the present invention which include a capability for demodulating and providing information to the user before the synchronization process is fully completed. As illustrated in FIG. 4, the transceiver acquires an initial estimate of the timing on the channel to which it is to be synchronized' and of the frequency setting required to synchronize with that channel (blocks 70 and 72). While FIG. 4 indicates that the timing estimate is first obtained, those of skill in the art will understand that the frequency and timing estimates may be obtained in any order and, typically, are obtained at the same time by performing correlations at a variety of phase rotations and identifying the sequence having the highest correlation to one of the known synchronization words. Those of skill in the art will also appreciate that some systems may include terminals with very accurate local oscillators such that frequency errors may not be problematic, in which case it would not be necessary to acquire an initial estimate of the frequency as shown in FIG. 4 at block 72.

As shown in FIG. 4, once the initial estimates of timing and frequency are obtained, the transceiver may demodulate bursts received over the channel to which it is acquiring synchronization (block 74). At the same time, or thereafter, the transceiver may also test the estimated synchronization point (i.e., the estimates of timing and/or frequency obtained at blocks 70 and 72) to determine if any modification is necessary (block 76). Such testing of the synchronization point might include, for example, determining if a calculated value of the TA was within an expected range, or refining the timing of the synchronization point by a partial symbol to more exactly align the timing of the mobile terminal to the base station. If adjustments are necessary (block 78), the transceiver may then adjust either the location of the synchronization point (i.e., the timing) and/or the frequency setting of its local oscillator to improve its synchronization to the new channel and a new burst is received (block 80). Operations then continue at block 74 as described above. If adjustments are not necessary at block 78, then the synchronization process is complete (block 82).

As discussed below, in certain systems it may not always be advisable to proceed with demodulation of the received burst (block 74) after obtaining the initial timing and frequency estimates (blocks 70 and 72). In such systems, it may be necessary to compare the initial estimates of the timing and/or frequency to specified thresholds to determine if there is sufficient confidence that the estimated values will allow for proper demodulation of the received burst. Such a confidence determination is illustrated in FIG. 5.

Figure 5A:
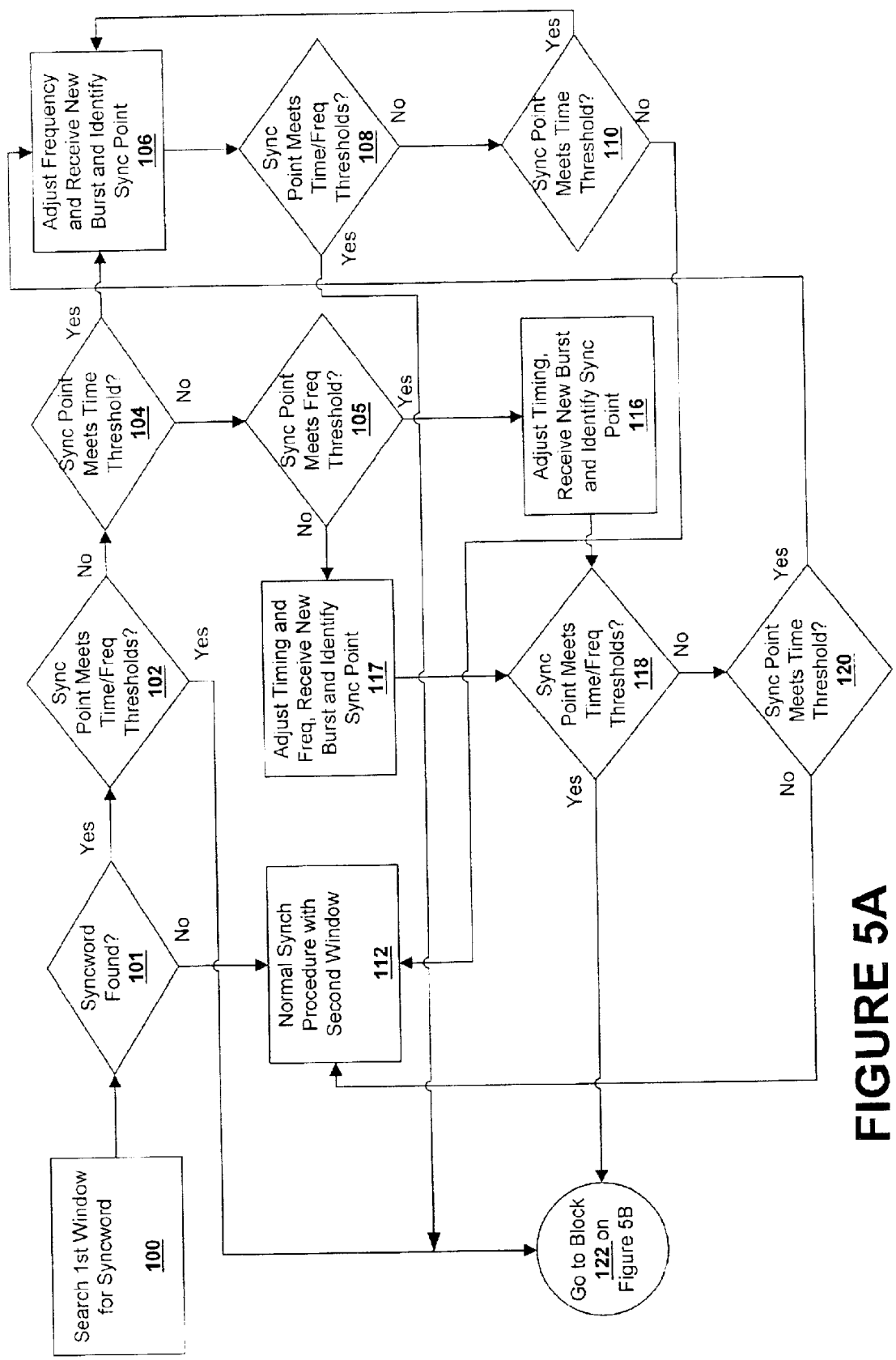
FIG. 5 is a flow chart illustrating operations for channel synchronization according to embodiments of the present invention.
Figure 5B:
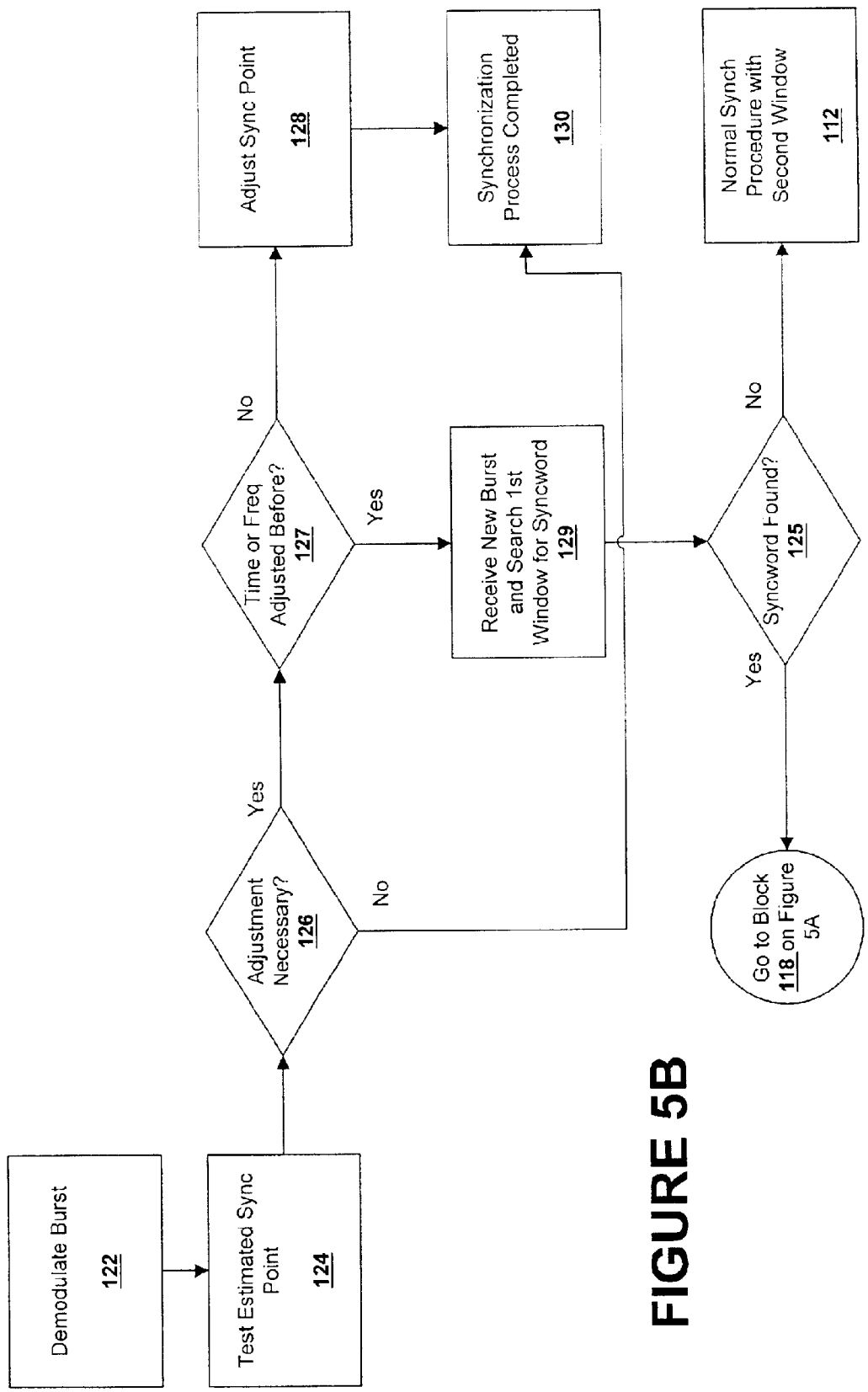

FIG. 5 (which is divided into two figures, FIGS. 5A and 5B) depicts operations for acquiring synchronization to a new channel in a TDMA communications system pursuant to further embodiments of the present invention. In the embodiment of FIG. 5, a first uncertainty window is defined (not pictured in FIG. 5). A burst is received over the new channel (not shown in FIG. 5), and that portion of the burst corresponding to the first uncertainty window is searched for a sequence that is sufficiently correlated with one of the set of known synchronization words (block 100). As noted above, the search of the first uncertainty window may, alternatively, be done in a variety of other ways, such as, for example, by searching until a sequence is found that has a correlation with one of the known synchronization words that exceeds a specified threshold. If a synchronization word is found (block 101), the synchronization point corresponding to the identified synchronization word (i.e., the beginning of the first symbol of the identified sequence) is then compared to both a time and a frequency threshold (block 102). As shown in FIG. 5, if the synchronization point meets both the time and frequency thresholds, the received burst (and any later received bursts) may then be demodulated and provided to the end user (block 122). However, as shown in FIG. 5, while the initial synchronization point may be sufficient for receiving signals, the mobile terminal may still not be sufficiently synchronized with the new base station to transmit signals. Therefore, after the initial estimate of the synchronization point has been located, the synchronization information may be tested to determine if the mobile terminal is fully synchronized with the channel (block 124), and/or to determine if synchronization for transmitting signals from the mobile terminal to the base station has been obtained.

Figure 6:
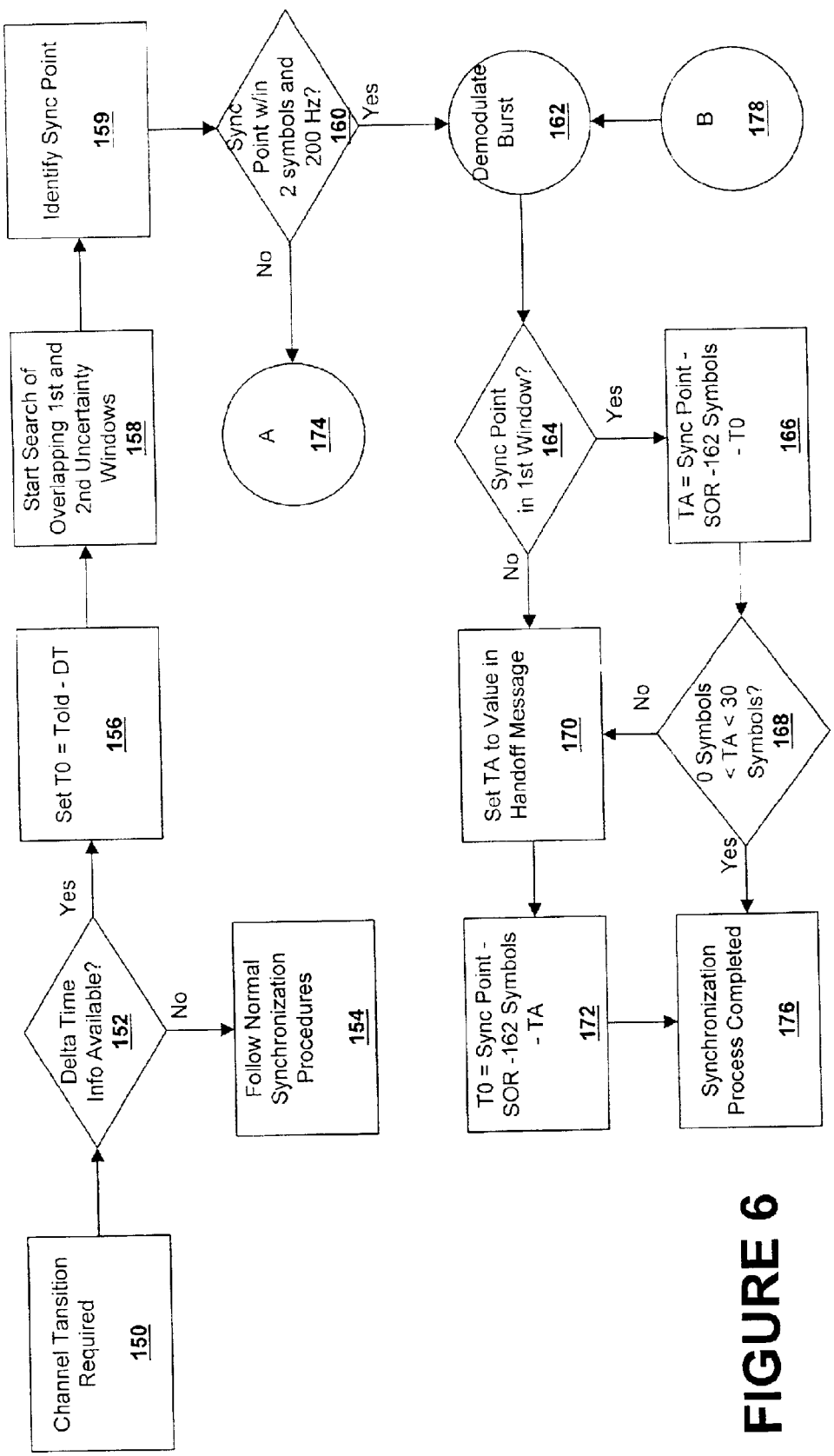
FIGS. 6 and 7 are flow charts which together illustrate operations for channel synchronization according to embodiments of the present invention.

Those of skill in the art will appreciate that a variety of different procedures may be used to test the adequacy of a synchronization point, including, for example, the test illustrated at block 160 of FIG. 6 which illustrates a particular test that may be used in TIA/EIA-136 systems. If the test performed at block 124 of FIG. 5 indicates that the synchronization point does not need adjusting, then the synchronization process is completed (block 130). If, however, at block 126 it is determined that the synchronization point does need adjusting, it is determined whether or not such adjustments were performed previously (block 127). If they were not, the receive and/or transmit timing and/or the frequency setting of the transceiver may be adjusted to fully synchronize the transceiver with the channel (block 128). After this adjustment is completed (if required), the synchronization process may be considered completed (block 130). If an adjustment has been previously performed (block 127), a new burst is received and the first window is searched for the synchronization word (block 129). If the synchronization word is found (block 125), operations proceed as discussed below at block 118. If not, the search for the synchronization word within the first uncertainty window is terminated, and the search is continued in the second uncertainty window (block 112). It will also be appreciated that it may be desirable to repeat the test of block 124 after the adjustment of block 128 to verify that timing synchronization has been achieved (not shown in FIG. 5).

If at block 102 the synchronization point does not meet both the time and frequency thresholds, it is determined whether or not the timing threshold was met (block 104). While illustrated as separate operations, the operations of blocks 102 and 104 can be completed as a single operation if desired. If at block 104 the timing threshold is met, the frequency setting of the local oscillator on the transceiver is adjusted, a new (second) burst is received, and the synchronization word is identified in this new burst (block 106). In systems such as TIA-EIA-136 in which the synchronization point is identified by correlating sequences of the received signal with each of the known synchronization words at a plurality of phase rotations, the necessary frequency adjustment may be determined based on the phase rotation associated with the best potential synchronization word identified in the window at block 100. At block 106 the timing may also be adjusted to adjust the location of the synchronization word identified at block 100 so that it is at the appropriate location of the received burst.

The synchronization point corresponding to the synchronization word may then be compared to both a time and a frequency threshold (block 108). Typically, the same time and frequency thresholds are used at blocks 102 and 108 of FIG. 5, although there is no requirement that identical thresholds be used.

If the comparisons performed at block 108 indicate that the synchronization point meets both the time and frequency thresholds, the received burst (and any later received bursts) may then be demodulated and provided to the end user (block 122). At this point, operations continue as shown in FIG. 5B and as discussed above. If, however, the comparison at block 108 indicates that either the time or frequency threshold were not met, operations continue at block 110 of FIG. 5 where it is determined if the synchronization point meets the timing threshold. If at block 110 it is determined that the timing threshold was met, the frequency is again adjusted and a new burst is received (block 106). If at block 110 it is determined that the timing threshold is not met, the search for the potential synchronization word within the first uncertainty window is terminated, and the search is continued in the second uncertainty window (block 112). Preferably, this search is performed using the current received burst and using the results of the unsuccessful search of the first uncertainty window.

If at block 104 in FIG. 5 the synchronization point identified at block 100 does not meet the timing threshold, it is determined if the frequency threshold is met (block 105). If so, the timing is adjusted, a new burst is received, and the synchronization point in the new burst is identified (block 116). The synchronization point may then be compared to both a time and a frequency threshold (block 118). Typically, the same time and frequency thresholds are used at block 118 as are used at blocks 102 and 108, although there is no requirement that identical thresholds be used.

If the comparisons performed at block 118 indicate that the synchronization point meets both the timing and frequency thresholds, the received burst (and any later received bursts) may be demodulated and provided to the end user (block 122), and operations may continue as shown in FIG. 5B and as discussed above. If, however, the comparison at block 118 indicates that either the timing or frequency threshold were not met, it is determined if the synchronization point met the timing threshold (block 120). If at block 120 it is determined that the timing threshold is not met, the search for the synchronization point within the first uncertainty window is terminated, and the search is continued in the second uncertainty window using the current received burst (block 112). If instead, at block 120, it is determined that the time threshold is met, operations continue at block 106 where the frequency is again adjusted and a new burst is received.

If at block 105 the frequency threshold is not met, both the timing and the frequency setting of the local oscillator on the transceiver is adjusted, a new burst is received, and the synchronization word is identified in this new burst (block 117). Operations then continue at block 118 as discussed above.

Figure 7:
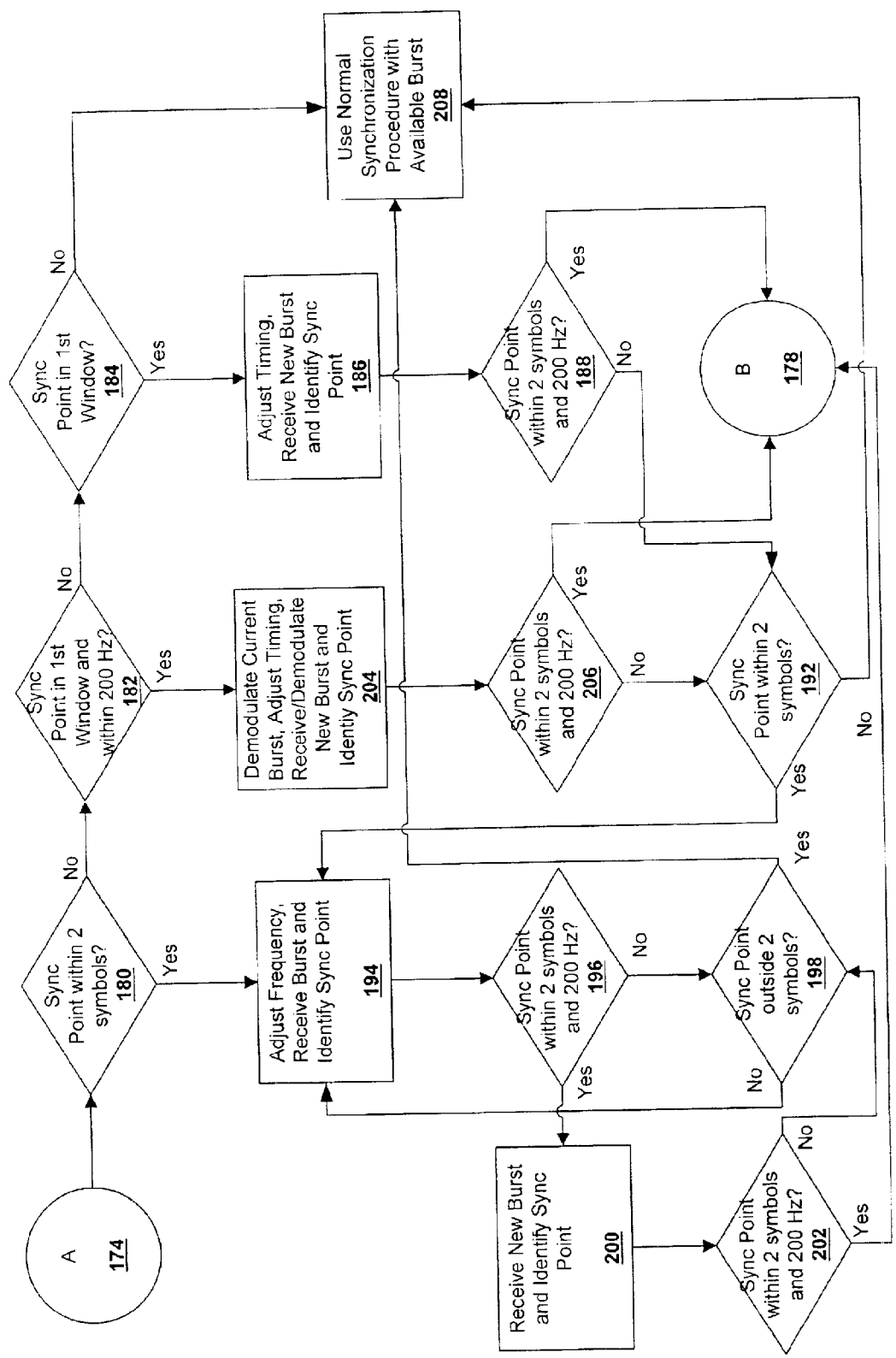

FIGS. 6 and 7 illustrate embodiments of the present invention which may be used in systems operating under the TIA/EIA-136 standard. The embodiments of FIGS. 6 and 7 illustrate both the use of overlapping first and second uncertainty windows and demodulation of received bursts before the synchronization process is fully completed. As indicated in FIG. 6, when a channel transition is required (block 150) whereby a mobile terminal needs to transition from one base station to a second base station (or for some other reason needs to switch channels on its current base station), the mobile terminal determines whether or not Delta Time information (i.e., information that allows it to more easily acquire time synchronization to the new channel) is available (block 152). If no Delta Time information is available, the terminal follows the normal synchronization procedures it would use to acquire synchronization to the new channel (block 154). If Delta Time information is available, the mobile terminal resets its transmit time T0 (i.e., the time at which it transmits signals to the base station during each frame) by adjusting its transmit time on the old channel ($T_{old}$) by the number of half symbols indicated in the Delta Time (DT) information (block 156).

As indicated in FIG. 6, once the transmit time for the new channel has been set at block 156, the mobile terminal starts to search the first uncertainty window for a known synchronization word (block 158). As noted above, in TIA/EIA-136 systems the uncertainty window is 37 symbols if accurate Delta Time information is available, where the 37 symbols correspond to the 4 symbols before the expected location of the synchronization word, the 14 symbols that comprise the synchronization word, and the 19 symbols which follow the expected location of the synchronization word. The expected location of the synchronization word is determined by assuming that the mobile terminal is physically located right beside the new base station, such that its TA value on the new channel would be zero. With this assumption, the expected location of the synchronization word is T0+162 symbols+SOR, as the base station should transmit its signal precisely one slot plus 45 symbols (the SOR value) after the mobile terminal transmits a signal to the base station. Thus, the search in block 158 would start at T0+158 symbols+SOR, which is 4 symbols before the "expected" location of the synchronization word.

The search of the first and second uncertainty windows continues until a sequence of symbols is identified that has a correlation with the known synchronization word that exceeds a specified threshold. As discussed above with respect to FIGS. 3 and 5, those skilled in the art will appreciate that the first sequence that exceeds this threshold may not be the sequence selected, as it may be beneficial to examine additional sequences that are near the sequence which exceeded the threshold in an effort to more accurately locate the precise location of the synchronization point (i.e., the start of the first symbol of the synchronization word). In the embodiment of FIG. 6, note that if the synchronization word is not located within the first uncertainty window, the search continues into the second uncertainty window. In this case the second uncertainty window starts co-expensive with the first uncertainty window at T0+158 symbols+SOR, and extends for 182 symbols to T0+339 symbols+SOR (i.e., it encompasses slightly more than an entire slot+14 symbols).

As noted above, the uncertainty window is searched until a sequence of symbols is identified having a high correlation with the known synchronization word. The synchronization point is identified as the point in time at which the first symbol of this sequence starts (block 159). This synchronization point is then compared to the "expected" location (T0+162 symbols+SOR) which was calculated using the Delta Time information (block 160). If the measured synchronization point is within 2 symbols of the "expected" location and the estimated frequency differential between the new base station and the mobile terminal is less than ±200 Hz, the received burst is demodulated and provided to the user of the mobile terminal (block 162). These particular thresholds were selected as appropriate thresholds for systems operating under the TIA/EIA-136 standard. The received burst is provided to the user even though, at this point, the accuracy of the timing has not been sufficiently confirmed such that the mobile terminal may transmit signals to the base station.

Operations continue by determining whether or not the synchronization point fell within the first uncertainty window (block 164). If it did, TA is set as the synchronization point, minus the SOR (45 symbols), minus 162 symbols, minus T0 (block 166). This calculated TA value is then examined to determine if it falls within an expected range of zero to 30 half symbols (block 168). This range is expected, because in TIA/EIA-136 systems, negative values of TA are theoretically impossible, and because values of TA greater than 30 half symbols indicate that the mobile terminal is well over 100 miles from the base station, which is also considered unlikely or impossible. If the value of TA is within the expected range, then the initial synchronization process is considered complete (block 176). If, on the other hand, the value of TA falls outside of the expected range, it is rejected (block 170). In this case, TA is set to the estimated value of the TA that the first base station provides to the mobile terminal in the handoff message informing the mobile terminal that it must transition to a new base station. When this occurs, it is an indication that the Delta Time information may have been faulty, and, thus, the transmit time is reset based on the identified location of the synchronization point and the estimate of TA provided in the handoff message (block 172). As shown in FIG. 6, this is done by resetting T0 to T0=Synchronization Point−162 symbols−SOR−TA.

As indicated in FIG. 6, if, in the test of block 160, the synchronization is not within 2 symbols of its "expected" location or if the frequency differential exceeds 200 Hz, then the process proceeds to a circle labeled "A" (block 174). The process that proceeds from circle "A" is illustrated in the flow chart of FIG. 7.

As shown in FIG. 7, if, in the test of block 160, the synchronization is not within 2 symbols of its "expected" location or if the frequency differential exceeds 200 Hz, the process continues by determining whether or not the synchronization point was within two symbols of its expected value (block 180). If it is not, the synchronization point is examined to determine if it is within the first uncertainty window (i.e., within the first 23 symbols) and whether or not the estimated frequency differential between the new base station and the mobile terminal is less than 200 Hz (block 182). If the test of block 182 is not met, it is determined whether or not the synchronization point falls within the first uncertainty window (block 184).

If, at this point, it is determined that the synchronization point falls within the first uncertainty window, the timing of the mobile terminal is adjusted so that the measured synchronization point will fall at the beginning of each new received burst (block 186). A new burst is then obtained and searched starting at the beginning of the burst for the synchronization point (block 186). However, since the frequency differential exceeds 200 Hz, no effort is made to demodulate the received burst, as the quality of the signal is unlikely to be acceptable. The synchronization point identified in the new burst is then tested (block 188). If the synchronization point is now found to be within 2 symbols of the start of the burst and the estimated frequency differential is less than 200 Hz, operations proceed as indicated at blocks 164, 166, 168, 170, 172, 176 of FIG. 6, as indicated by the reference to circle "B" (block 178) of FIG. 7.

If the new synchronization point does not meet the test set forth in block 188, it is tested again (block 192) to determine if it is within 2 symbols of the beginning of the burst. If it is not, the normal synchronization procedure is followed using the available burst (block 208). If the new synchronization point is within 2 symbols of the beginning of the burst, the frequency of the mobile terminal is adjusted to correct for the estimated frequency differential, a new burst is received, and the synchronization point within this new burst is identified (block 194). This new synchronization point is examined to determine if it is within 2 symbols of the start of the burst and if the estimated frequency differential is less than 200 Hz (block 196). If it is, a second test of the synchronization point is performed in that another new burst is received and the synchronization point within that burst identified (block 200), and this latter synchronization point is likewise examined to determine if it is within 2 symbols of the start of the burst and if the estimated frequency differential is less than 200 Hz (block 202). If it is, operations proceed as indicated at blocks 164, 166, 168, 170, 172, 176 of FIG. 6, as indicated by the reference to circle "B" (block 178) on FIG. 7. If not, the latest synchronization point is examined to determine if it falls more than 2 symbols from the beginning of the burst (block 198). If it does, the normal synchronization procedure is followed using the available burst (block 208). If not, the process continues at block 194 as described above.

If at block 196 the synchronization point is not within 2 symbols of its expected location or the frequency differential exceeds 200 Hz, the process continues at block 198 as described above.

Finally, if at block 182 the synchronization point is within the first uncertainty window and the frequency differential is less than 200 Hz, the current burst is demodulated and the timing of the mobile terminal is adjusted so that the measured synchronization point will fall at the appropriate location in each new received burst (block 204). A new burst is received and this burst is demodulated since the frequency error is considered within an acceptable range, and is also searched starting at the beginning of the burst for the synchronization point (block 204). The synchronization point identified in the new burst is then tested (block 206). If the synchronization point is now found to be within 2 symbols of the start of the burst and the estimated frequency differential is less than 200 Hz, operations proceed as indicated at blocks 164, 166, 168, 170, 172, 176 of FIG. 6, as indicated by the reference to circle "B" (block 178) on FIG. 7. If not, the process proceeds at block 192 as described above.

The flowcharts and block diagrams of FIGS. 1 through 7 illustrate the architecture, functionality and operation of possible implementations providing synchronization according to embodiments of the present invention. In this regard, each block or blocks in the flowcharts or block diagrams represent a module, segment, a portion of code, which comprises one or more executable instructions for implementing the specified logical functions(s). It should also be noted that in some alternative implementations, the functions noted in the blocks may occur out of the order noted in the figures. For example, two blocks shown in succession may, in fact, be executed substantially concurrently or the blocks may sometimes be executed in the reverse order, depending upon the functionality involved.

While the present invention has primarily been described with respect to a TDMA communications system, those of skill in the art will appreciate that the methods and systems described herein may likewise be used with code division multiple access ("CDMA") communications systems. Accordingly, the present invention should not be construed as being limited to TDMA systems, but as applying to both TDMA and CDMA systems.

In the drawings, specification and examples, there have been disclosed typical preferred embodiments of the invention and, although specific terms are employed, these terms are used in a generic and descriptive sense only and not for purposes of limitation, the scope of the invention being set forth in the following claims. Accordingly, those of skill in the art will themselves be able to conceive of embodiments of synchronization methods other than those explicitly described herein without going beyond the scope of the present invention.

That which is claimed is:

1. A method for a transceiver to acquire synchronization to a channel in a communications system, the method comprising:

defining a first uncertainty window and a second uncertainty window within a burst received over the channel in which the transceiver will search for a known synchronization word, wherein the first uncertainty window is smaller than the second uncertainty window;

searching the first uncertainty window for a synchronization sequence that corresponds to the known synchronization word;

determining if the synchronization sequence has been identified within the first uncertainty window;

searching the second uncertainty window for the synchronization sequence if the synchronization sequence was not located within the first uncertainty window;

identifying the synchronization sequence within at least one of the first and second uncertainty windows; and synchronizing the transceiver to the channel based on the location of the synchronization sequence.

2. The method of claim 1, wherein at least the last portion of the first uncertainty window is within the second uncertainty window; and wherein searching the second uncertainty window for the synchronization sequence comprises searching the remainder of the second uncertainty window for the synchronization sequence.

3. The method of claim 2, wherein the location in time of the first uncertainty window is selected based on timing information provided over another channel in the communications system on which the transceiver was previously communicating.

4. The method of claim 3, wherein the first and second uncertainty windows have the same starting point.

5. The method of claim 3, wherein the entire first uncertainty window is searched for the synchronization sequence.

6. The method of claim 3, wherein determining if the synchronization sequence has been located within the first uncertainty window comprises determining if a portion of the received burst that falls within the first uncertainty window has a correlation with the known synchronization word that exceeds a specified threshold.

7. The method of claim 6, wherein determining if the synchronization sequence has been located within the first uncertainty window further comprises determining if a phase-rotated portion of the received burst that falls within the first uncertainty window has a correlation with the known synchronization word that exceeds a specified threshold.

8. The method of claim 7, wherein the method further comprises:

determining if the identified synchronization sequence is within a specified distance in time from an expected location; and determining if an estimated frequency offset corresponding to the phase rotation of the identified synchronization sequence is within a specified limit.

9. The method of claim 8, wherein the transceiver obtains the expected location of the synchronization sequence over another channel in the communications system on which the transceiver was previously communicating.

10. The method of claim 8, wherein the method further comprises:

demodulating the burst received over the channel if the synchronization sequence is within the specified distance in time from the expected location and if the estimated frequency offset corresponding to the phase rotation of the identified synchronization sequence is within the specified limit; and then adjusting the frequency setting of the transceiver to better synchronize the transceiver with the channel.

11. The method of claim 10, wherein the method further comprises adjusting a frame timing to better synchronize the transceiver with the channel.

12. The method of claim 10, wherein the method further comprises calculating the time at which the transceiver should transmit to communicate over the channel based on the location of the identified synchronization sequence if the synchronization sequence was within the first uncertainty window.

13. The method of claim 10, wherein the method further comprises calculating the time at which the transceiver should transmit to communicate over the channel based on a timing advance estimate provided to the transceiver over another channel in the communications system on which the transceiver was previously communicating if the synchronization sequence was outside the first uncertainty window.

14. The method of claim 8, wherein the method further comprises demodulating the burst received over the channel if the synchronization sequence is within the specified distance in time from the expected location and if the estimated frequency offset corresponding to the phase rotation of the identified synchronization sequence is within the specified limit.

15. A method for a transceiver to acquire synchronization to a channel in a communications system, the method comprising:

receiving a burst over the channel;

receiving information regarding the expected location of a known synchronization word within the burst received over the channel;

searching the burst received over the channel to identify a portion of the burst that corresponds to the known synchronization word;

determining if the portion of the burst received over the channel that corresponds to the known synchronization word is within a specified distance in time from the expected location;

estimating the frequency differential between the burst received over the channel and the frequency setting on the transceiver; and determining if the estimated frequency differential is within a specified limit.

16. The method of claim 15, wherein the method further comprises:

adjusting a frequency of a local oscillator in the transceiver to correspond to the estimated frequency of the burst received over the channel if the estimated frequency differential between the received signal and the frequency setting on the transceiver is outside the specified limit;

receiving at the transceiver a second burst over the channel;

searching the second burst received over the channel to identify a portion of the second burst that corresponds to the known synchronization word;

determining if the portion of the second burst received over the channel that corresponds to the known synchronization word is within the specified distance in time from the expected location;

estimating the frequency differential between the second burst received over the channel and the frequency setting on the transceiver; and determining if the estimated frequency differential between the second burst received over the channel and the frequency setting on the transceiver is within the specified limit.

17. The method of claim 15, wherein the method further comprises:

setting a timing advance value at the transceiver based on the location of the portion of the burst received over the channel that corresponds to the known synchronization word if the location of the portion of the burst received over the channel that corresponds to the known synchronization word is within the specified distance in time from an expected location; and otherwise setting the timing advance value at the transceiver to a timing advance value provided to the transceiver in a handoff message.

18. The method of claim 15, wherein the method further comprises:

demodulating the burst received over the channel if the portion of the burst received over the channel that corresponds to the known synchronization word is within the specified distance in time from the expected location and if the estimated frequency differential between the burst received over the channel and the frequency setting on the transceiver is within the specified limit; and then adjusting a frame timing to better synchronize the transceiver with the channel; and adjusting the frequency setting of the transceiver to better synchronize the transceiver with the channel.

19. The method of claim 15, wherein the method further comprises demodulating the burst received over the channel if the portion of the burst received over the channel that corresponds to the known synchronization word is within the specified distance in time from the expected location and if the estimated frequency differential between the burst received over the channel and the frequency setting on the transceiver is within the specified limit.

20. A system for a transceiver to acquire synchronization to a channel in a communications system by identifying a known synchronization word in a burst received at the transceiver over the channel, comprising:

means for defining a first uncertainty window and a second uncertainty window within the burst received over the channel in which the transceiver will search for the known synchronization word, wherein the first uncertainty window is smaller than the second uncertainty window;

means for searching the first uncertainty window for the known synchronization word;

means for determining if the known synchronization word has been located within the first uncertainty window; and means for searching the second uncertainty window for the known synchronization word.

21. The system of claim 20, wherein the means for defining a first uncertainty window and a second uncertainty window comprise means for defining overlapping first and second uncertainty windows.

22. The system of claim 21, means for searching the second uncertainty window for the known synchronization word comprises means for searching the portion of the second uncertainty window that is not part of the first uncertainty window for the known synchronization word.

* * * * *